US009989818B2

(12) United States Patent
Jeon et al.

(10) Patent No.: US 9,989,818 B2
(45) Date of Patent: Jun. 5, 2018

(54) LIQUID CRYSTAL DISPLAY DEVICE

(71) Applicant: Samsung Display Co., Ltd., Yongin (KR)

(72) Inventors: Sang Jin Jeon, Suwon-si (KR); Sang Uk Lim, Yongin-si (KR); Mee Hye Jung, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 701 days.

(21) Appl. No.: 14/250,138

(22) Filed: Apr. 10, 2014

(65) Prior Publication Data

US 2015/0070645 A1   Mar. 12, 2015

(30) Foreign Application Priority Data

Sep. 10, 2013 (KR) ........................ 10-2013-0108500

(51) Int. Cl.
*G02F 1/1337* (2006.01)
*G02F 1/1343* (2006.01)

(52) U.S. Cl.
CPC .................. *G02F 1/134336* (2013.01); *G02F 2001/134318* (2013.01)

(58) Field of Classification Search
USPC .................................. 349/48, 129, 130, 144
See application file for complete search history.

(56) References Cited

U.S. PATENT DOCUMENTS

| 5,870,075 | A  | * | 2/1999 | Yamazaki | ........... | G02F 1/13624 345/690 |
| 8,098,353 | B2 | * | 1/2012 | Kim | .................. | G02F 1/133707 349/129 |
| 8,159,429 | B2 | * | 4/2012 | Kim | .................. | G02F 1/133707 345/87 |
| 8,305,528 | B2 | * | 11/2012 | Wang | ................ | G02F 1/133555 349/114 |
| 2005/0099582 | A1 | | 5/2005 | Doi et al. | | |
| 2008/0136992 | A1 | * | 6/2008 | Kim | .................. | G02F 1/133514 349/48 |
| 2008/0297675 | A1 | * | 12/2008 | Kim | .................. | G02F 1/136213 349/38 |
| 2009/0086149 | A1 | | 4/2009 | Kim | | |

(Continued)

FOREIGN PATENT DOCUMENTS

KR   10-2009-0129774   12/2009
KR   10-2012-0031801   4/2012

*Primary Examiner* — Edward Glick
*Assistant Examiner* — David Chung
(74) *Attorney, Agent, or Firm* — H.C. Park & Associates, PLC

(57) ABSTRACT

Provided are display device. According to an aspect of the present invention, there is provided a display device comprising a first substrate, a gate wiring which is formed on the first substrate and extends in a first direction, a data wiring which is insulated from the gate wiring, intersects the gate wiring, and extends in a second direction, and a pixel electrode which comprises a first subpixel electrode to which a first data voltage is applied from the data wiring and a second subpixel electrode to which a second data voltage lower than the first data voltage is applied from the data wiring, wherein the first subpixel electrode is surrounded by the second subpixel electrode, and the second subpixel electrode does not overlap the data wiring.

19 Claims, 15 Drawing Sheets

(56) References Cited

U.S. PATENT DOCUMENTS

| | | |
|---|---|---|
| 2009/0310049 A1 | 12/2009 | Hsu et al. |
| 2009/0310075 A1* | 12/2009 | Kim .................. G02F 1/133707 |
| | | 349/144 |
| 2010/0195034 A1* | 8/2010 | Lee ................... G02F 1/133753 |
| | | 349/124 |
| 2011/0149223 A1 | 6/2011 | Tsao et al. |
| 2013/0033668 A1 | 2/2013 | Yao et al. |
| 2013/0063686 A1* | 3/2013 | Tashiro ............. G02F 1/133707 |
| | | 349/98 |

* cited by examiner

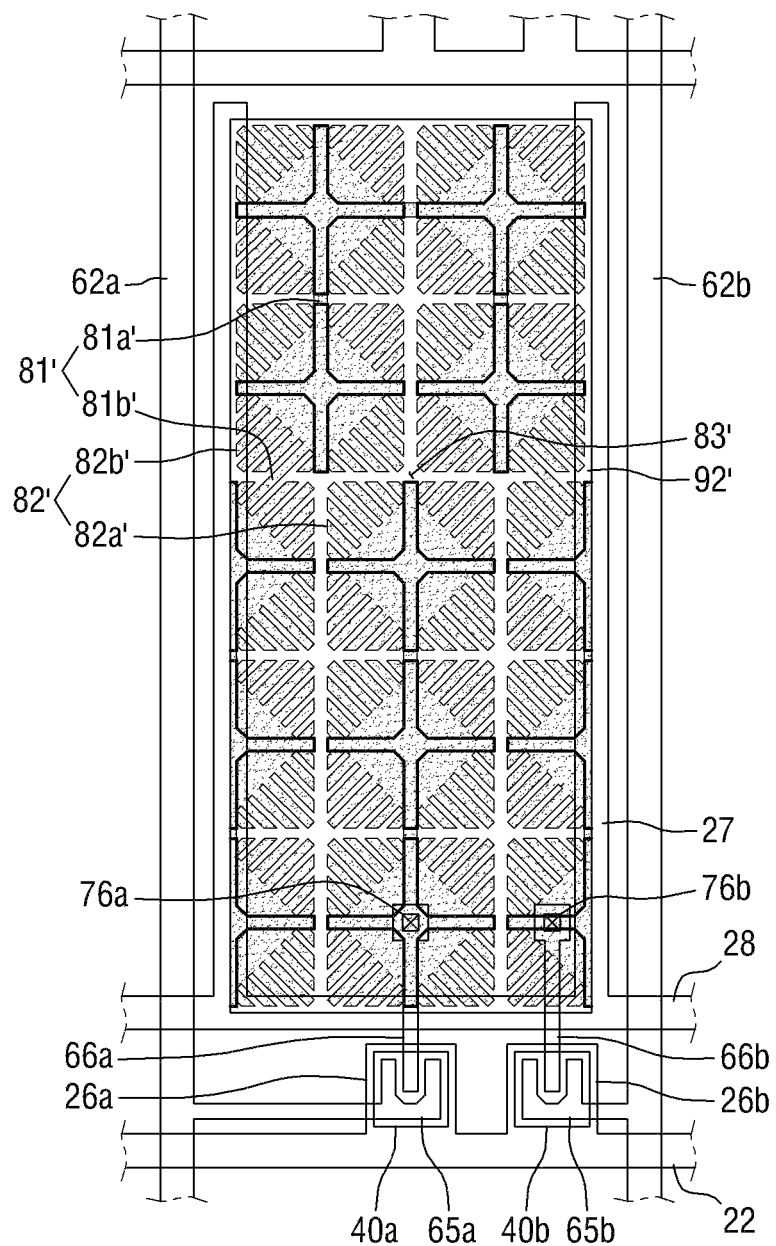

LIQUID CRYSTAL DISPLAY DEVICE

CROSS REFERENCE TO RELATED APPLICATION

This application claims priority from and the benefit of Korean Patent Application No. 10-2013-0108500, filed on Sep. 10, 2013, which is hereby incorporated by reference for all purposes as if fully set forth herein.

BACKGROUND

Field

Exemplary embodiments of the present invention relate to a display device.

Discussion of the Background

Display devices are devices that visually display data. Examples of display devices include liquid crystal displays (LCDs), electrophoretic displays, organic light-emitting displays (OLEDs), inorganic electroluminescent (EL) displays, field emission displays, surface-conduction electron-emitter displays, plasma displays, and cathode ray displays.

Of the display devices, LCDs are one of the most widely used types of display devices. Generally, an LCD includes a pair of panels having electric field generating electrodes, such as pixel electrodes and a common electrode, and a liquid crystal layer interposed between the panels. In an LCD, voltages are applied to electric field generating electrodes to generate an electric field. Accordingly, the alignment of liquid crystal molecules of a liquid crystal layer is determined, and polarization of incident light is controlled. As a result, a desired image is displayed on the LCD panel.

In a vertical alignment (VA) mode LCD, liquid crystal molecules are arranged with the main direction of the molecules being perpendicular to the upper and lower display panels when no electric field is applied to the liquid crystal molecules. VA mode LCDs are popular due to their high contrast ratios and wide standard viewing angles. However, a drawback of the VA mode LCD is that it may have poor lateral visibility when compared to frontal visibility. To overcome this drawback, each pixel may be partitioned into two subpixels, and a switching device may be formed in each subpixel. Then, a different voltage may be applied to each subpixel.

In such a conventional LCD, however, a subpixel electrode, to which a relatively high voltage is applied, may be coupled to a pair of data lines located on both sides of the subpixel electrode, thus causing vertical crosstalk. When this configuration is used, display quality of the LCD may be degraded. Thus, it becomes advantageous to reduce the coupling of the subpixel electrode to which the relatively high data voltage is applied and the pair of data lines located on both sides of the subpixel electrode.

To reduce coupling, a gap between the subpixel electrode and the pair of data lines may be increased. As a result, vertical crosstalk can be prevented to some degree.

However, an increase in the gap between the subpixel electrode to which the relatively high data voltage is applied and the pair of data lines located on both sides of the subpixel electrode detrimentally reduces an aperture ratio of the display device.

SUMMARY OF THE INVENTION

Exemplary embodiments of the present invention provide a display device having reduced vertical crosstalk and, and an improved aperture ratio.

However, aspects of the present invention are not restricted to the one set forth herein. The above and other aspects of the present invention will become more apparent to one of ordinary skill in the art to which the present invention pertains by referencing the detailed description of the present invention given below.

An exemplary embodiment of the present invention discloses a display device including a first substrate, a gate wiring which is disposed on the first substrate and extends in a first direction, and a data wiring which is insulated from the gate wiring, intersects the gate wiring, and extends in a second direction. The display device further includes a pixel electrode which includes a first subpixel electrode to which a first data voltage is applied from the data wiring and a second subpixel electrode to which a second data voltage lower than the first data voltage is applied from the data wiring. The first subpixel electrode is surrounded by the second subpixel electrode and the second subpixel electrode does not overlap the data wiring.

An exemplary embodiment of the present invention also discloses a display device comprising a substrate, a gate wiring which is disposed on the substrate and extends in a first direction, and a data wiring which is insulated from the gate wiring, intersects the gate wiring, and extends in a second direction. The display device further includes a pixel is electrode which includes a first subpixel electrode to which a first data voltage is applied from the data wiring and a second subpixel electrode to which a second data voltage lower than the first data voltage is applied from the data wiring. The first subpixel electrode is surrounded by the second subpixel electrode, and the second subpixel electrode is disposed adjacent to both sides of the data wiring.

An exemplary embodiment of the present invention further discloses a display device comprising a first substrate, a gate wiring that is formed on the first substrate and extends in a first direction, and a data wiring which is insulated from the gate wiring, intersects the gate wiring, and extends in a second direction. The display device further includes a pixel electrode which comprises a first subpixel electrode to which a first data voltage is applied from the data wiring, and a second subpixel electrode to which a second data voltage lower than the first data voltage is applied from the data wiring and which surrounds the first subpixel electrode. The pixel electrode comprises a plurality of unit pixel electrodes. Each of the unit pixel electrodes includes a plate, a stem which protrudes from the plate, and a plurality of branches which protrude from the plate or the stem.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the is principles of the invention.

FIG. 15 is a layout diagram of the display device including the lower display panel of FIG. 13 and the upper display panel of FIG. 14.

DETAILED DESCRIPTION OF THE ILLUSTRATED EMBODIMENTS

Figure 1:
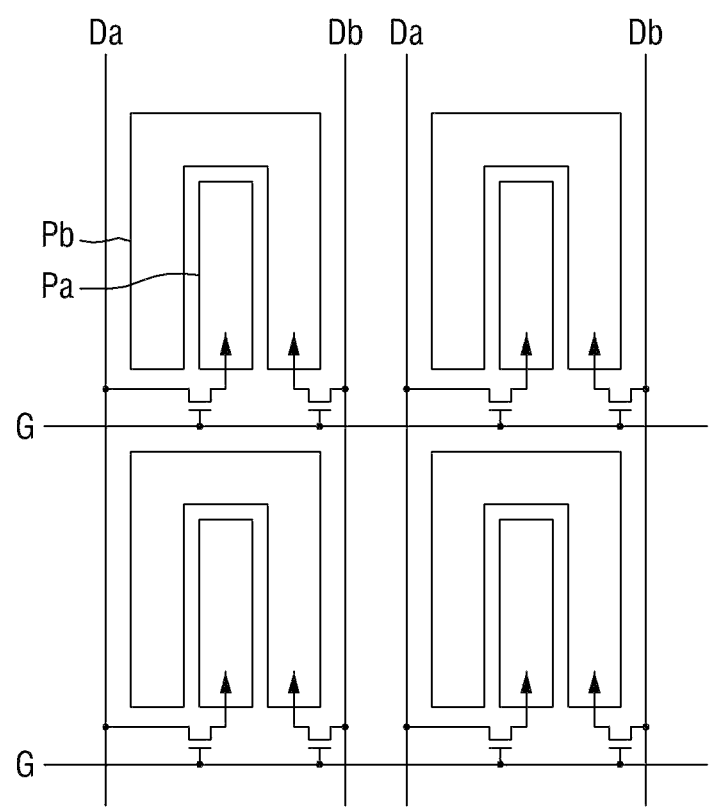
FIG. 1 is a schematic diagram of a pixel array of a display device according to an exemplary embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

It will be understood that when an element or layer is referred to as being "on," "connected to," or "coupled to" another element or layer, it can be directly on, directly connected to or directly coupled to the other element or layer, or intervening elements or layers may be present. In contrast, when an element is referred to as being "directly on" or "directly connected is to," or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). In the entire description of the present invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Display devices are devices that display images. Examples of the display devices may include liquid crystal displays (LCDs), electrophoretic displays, organic light-emitting displays, inorganic electroluminescent (EL) displays, field emission displays, surface-conduction electron-emitter displays, plasma displays, and cathode ray displays.

Hereinafter, an LCD will be described as an example of a display device according to an embodiment of the present invention. However, the display device according to the present invention is not limited to the LCD, and various types of displays may be used.

The present invention will now be described more fully with reference to the accompanying drawings, in which exemplary embodiments of the invention are shown.

Figure 2:
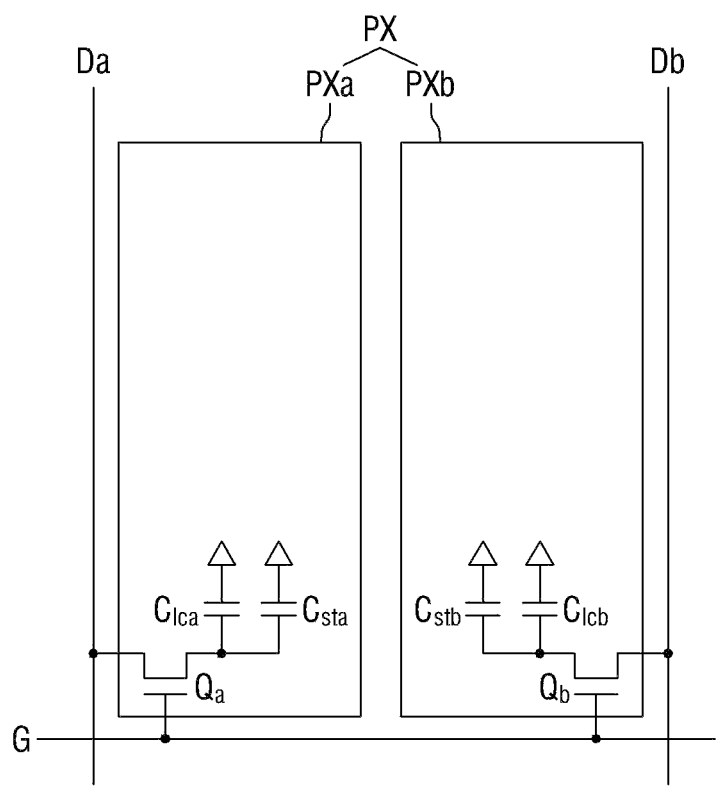
FIG. 2 is an equivalent circuit diagram of a pixel included in the display device of FIG. 1.

FIG. 1 is a schematic diagram of a pixel array of a display device according to an embodiment of the present invention. FIG. 2 is an equivalent circuit diagram of a pixel PX included in the display device of FIG. 1.

The display device according to the current embodiment may include a panel assembly, a gate driver and a data driver connected to the panel assembly, a gray voltage is generator connected to the data driver, and a signal controller controlling the panel assembly, the gate driver, the data driver, and the gray voltage generator.

Referring to FIGS. 1 and 2, the panel assembly may include a plurality of display signal lines (G, Da, Db) and a plurality of pixels PX which are connected to the display signal lines (G, Da, Db) and arranged substantially in a matrix. The panel assembly may also include lower and upper display panels facing each other and a liquid crystal layer interposed between the lower and upper display panels.

The display signal lines (G, Da, Db) are formed on the lower display panel. The display signal lines (G, Da, Db) include a plurality of gate lines G for transmitting gate signals and a plurality of first and second data lines Da and Db for transmitting data signals. The gate lines G extend substantially in a row direction and are substantially parallel to each other. The first and second data lines Da and Db extend substantially in a column direction and are substantially parallel to each other.

Each pixel PX includes a pair of subpixels PXa and PXb. Each of the subpixels PXa and PXb includes a switching device Qa and Qb, respectively. Switching devices Qa and Qb are connected to the first and second data lines Da and Db, respectively, and one gate line G. Each of the subpixels PXa and PXb further includes a liquid crystal capacitor Clca and Clcb, respectively, connected to the switching device Qa and Qb, respectively. Optionally, storage capacitors Csta and Cstb are connected to the switching device Qa and Qb, respectively. In other words, two data lines Da and Db and one gate line G are connected to a pair of subpixels PXa and PXb. The storage capacitor Csta and Cstb may be omitted according to the needs of the device.

The switching devices Qa and Qb in each of the subpixels PXa and PXb, is respectively, may be a thin-film transistor (TFT) formed on the lower display panel. Specifically, the switching devices Qa and Qb may be a three-terminal device that includes a control terminal (hereinafter, referred to as a gate electrode) connected to the gate line G to which a gate signal is transmitted, an input terminal (hereinafter, referred to as a source electrode) connected to the first or second data line Da or Db, and an output terminal (hereinafter, referred to as a drain electrode) connected to the liquid crystal capacitor Clca or Clcb and the storage capacitor Csta or Cstb.

The liquid crystal capacitors Clca and Clcb use a first and second subpixel electrode Pa and Pb, respectively, in the lower display panel and a common electrode in the upper display panel as two terminals. The liquid crystal layer between the first and second subpixel electrodes Pa and Pb and the common electrode may function as a dielectric. The first and second subpixel electrodes Pa and Pb are connected to the switching devices Qa and Qb, respectively. The common electrode is provided to the entire surface of the upper display panel, and common voltage Vcom is applied to the common electrode. The common electrode may alternatively be disposed on the lower display panel. In this case, at least one of the first and second subpixel electrodes Pa and Pb and the common electrode may be linear or bar-shaped.

The storage capacitors Csta and Cstb supplement the liquid crystal capacitors Clca and Clcb, respectively. Each of the storage capacitors Csta and Cstb may include storage wiring and one of the first and second subpixel electrodes Pa and Pb, which are disposed on the lower display panel and overlap each other with an insulating material disposed therebetween. A voltage, such as the common voltage Vcom, is applied to the storage wiring.

Each pixel PX may display one of three primary colors (spatial division). Alternatively, each pixel PX may display the three primary colors at different times (time is division) so that a spatio-temporal sum of the three primary colors can produce a desired, recognizable color. The three primary colors may be red (R), green (G), and blue (B), but may include other colors. As an example of spatial division, each pixel PX may include a color filter representing one of the three primary colors in a region of the upper display panel. In addition, the color filter may be disposed on or under the first and second subpixel electrodes Pa and Pb of the lower display panel.

The gate driver is connected to the gate lines G and transmits a gate signal, i.e. a gate-on voltage Von or a gate-off voltage Voff, to the gate lines G.

The data driver is connected to each of a pair of the first and second data lines Da and Db. The data driver applies a data voltage to any one of a pair of the subpixels Pa and Pb that form each pixel PX through the first data line Da. The data driver applies a different data voltage to the other one of the subpixels Pa and Pb through the second data line Db.

The gate driver or the data driver may be directly disposed on the panel assembly in the form of a plurality of driving integrated circuit (IC) chips or may be disposed on flexible printed circuit films and attached to the panel assembly in the form of tape carrier packages. Alternatively, the gate driver or the data driver may be integrated into the panel assembly together with the display signal lines, such as at least one of the gate lines G and the first and second data lines Da and Db, the switching devices Qa and Qb, and other thin film transistor elements.

The gray voltage generator may generate two sets of gray voltages (or reference gray voltages) related to the transmittance of the pixels PX and apply the generated sets of gray voltages to the data driver. In other words, the two sets of the gray voltages may be independently applied to each pair of subpixels PXa and PXb that form each pixel PX. However, the present invention is not limited thereto. The gray voltage generator may generate only one set of gray voltages.

The signal controller is configured to control the operations of the gate driver and the data driver.

Referring to FIGS. 1 and 2, each pixel PX includes two switching devices Qa and Qb and the first and second subpixel electrodes Pa and Pb connected to the switching devices Qa and Qb, respectively. A relatively high data voltage may be applied to the first subpixel electrode Pa, and a relatively low data voltage may be applied to the second subpixel electrode Pb. Hereinafter, a high or low data voltage is referred to as a large or small difference between the common voltage and the data voltage, respectively.

In the current embodiment, the second subpixel electrode Pb surrounds the first subpixel electrode Pa, thereby minimizing vertical crosstalk in the display device. That is, the coupling of the first and second data lines Da and Db to the first subpixel electrode Pa is minimized while the first and second data lines Da and Db are coupled to the second subpixel electrode Pb. Accordingly, vertical crosstalk in the display device can be minimized. Further, an aperture ratio of the display device can be improved. This will be described in detail later.

Hereinafter, the display device according to an embodiment of the present invention will be described in detail with reference to FIGS. 3 through 9. The display device according to the current embodiment includes the lower display panel having a TFT array, the upper display panel facing the lower display panel, and the liquid crystal layer interposed between the lower and upper display panels.

Figure 3:
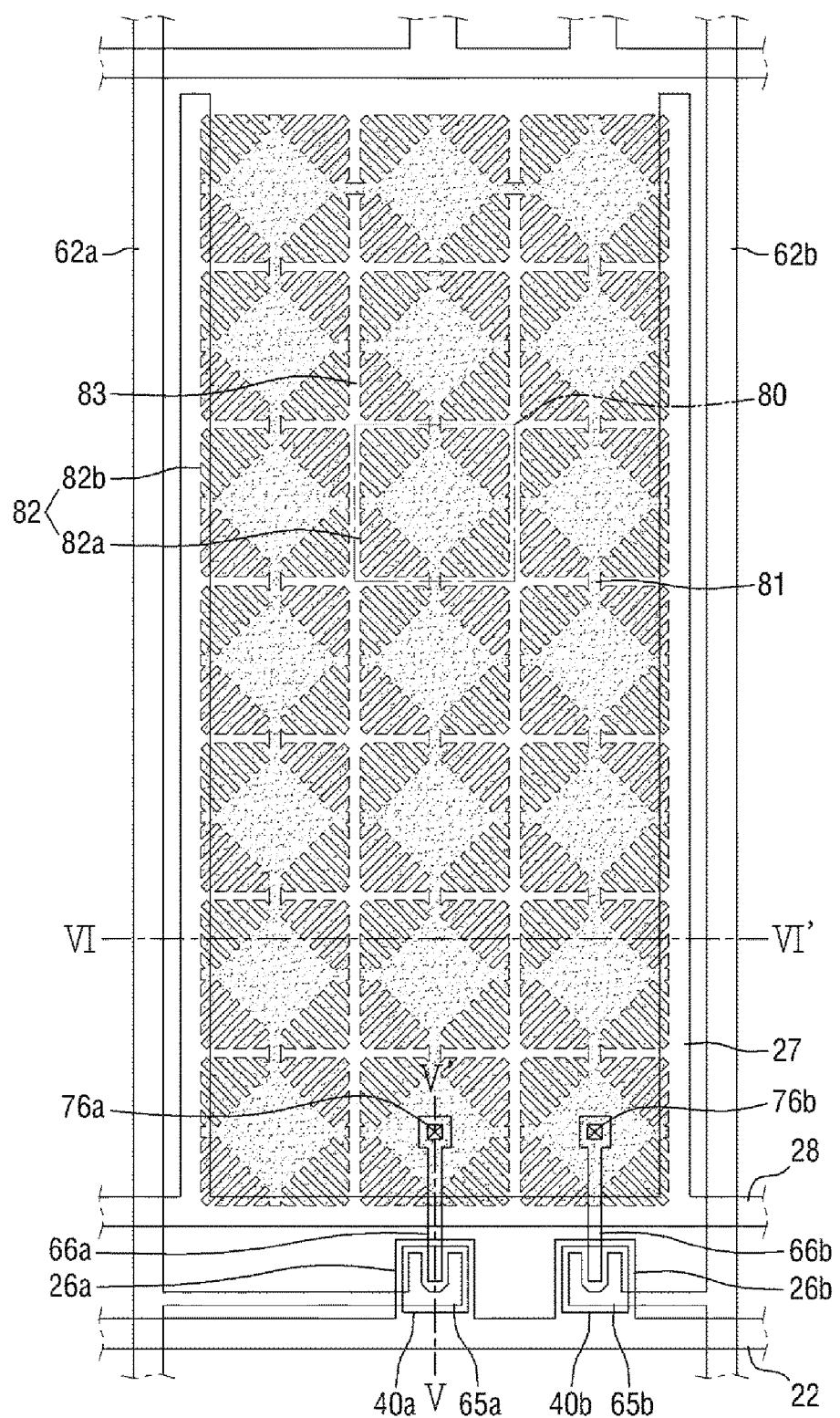
FIG. 3 is a layout diagram of a lower display panel including a pixel of the display device shown in FIG. 1.
Figure 4:
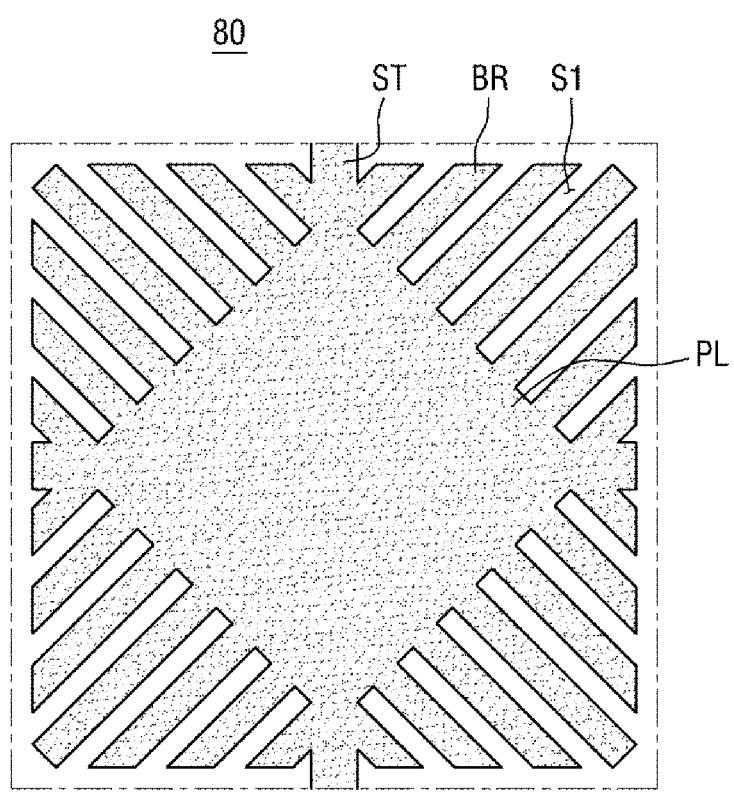
FIG. 4 is an enlarged view of a unit pixel electrode of the lower display panel shown in FIG. 3.
Figure 5:
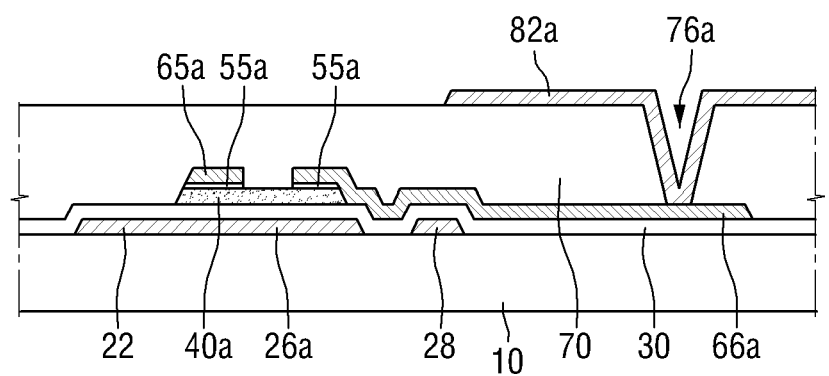
FIG. 5 is a cross-sectional view of the lower display panel taken along the line V-V' of FIG. 3.
Figure 6:
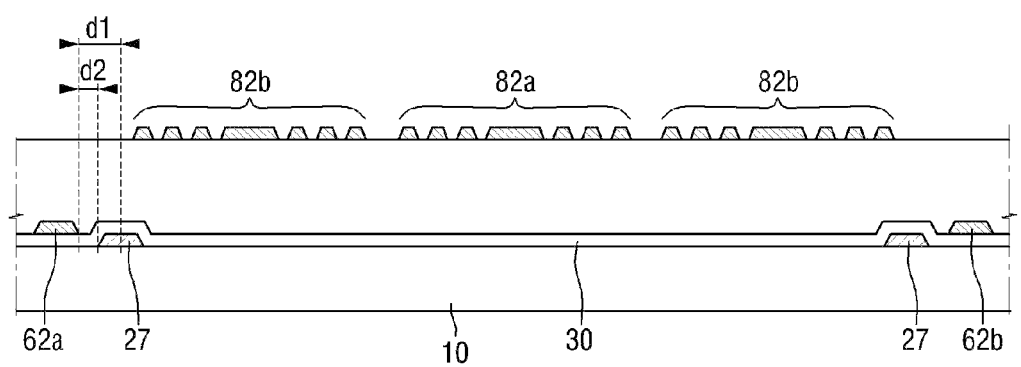
FIG. 6 is a cross-sectional view of the lower display panel taken along the line VI-VI' of FIG. 3.

The lower display panel of the display device according to an embodiment of the present invention will now be described in detail with reference to FIGS. 3 through 6. FIG. 3 is a is layout diagram of the lower display panel including a pixel of the display device shown in FIG. 1. FIG. 4 is an enlarged view of a unit pixel electrode 80 of the lower display panel shown in FIG. 3. FIG. 5 is a cross-sectional view of the lower display panel taken along the line V-V' of FIG. 3. FIG. 6 is a cross-sectional view of the lower display panel taken along the line VI-VI' of FIG. 3.

A gate line 22 is formed on a substrate 10 which may be formed of a transparent material, for example, transparent glass or transparent plastic. The gate line 22 generally extends in a horizontal direction and transmits a gate signal. The gate line 22 is connected to each pixel. The gate line 22 includes a pair of first and second protruding gate electrodes 26a and 26b. The gate line 22 and the first and second gate electrodes 26a and 26b are collectively referred to as gate wirings.

A storage line 28 is formed on the substrate 10. The storage line 28 generally extends across a pixel region in the horizontal direction to be substantially parallel to the gate line 22. In addition, storage electrodes 27 protrude perpendicularly from the storage line 28. In an exemplary embodiment, the storage line 28 may be disposed parallel to the gate line 22 to partially overlap a lower edge of a pixel electrode 82, and the storage electrodes 27 may be disposed parallel to first and second data lines 62a and 62b to partially overlap left and right edges of the pixel electrode 82, respectively. Specifically, a portion of the storage line 28 may overlap a first subpixel electrode 82a and a second subpixel electrode 82b, and a portion of each of the storage electrodes 27 may overlap the second subpixel electrode 82b. However, the storage electrodes 27 may not overlap the first and second data lines 62a and 62b. The storage line 28 and each of the storage electrodes 27 partially overlap the pixel electrode 82 to form a storage capacitor which improves the charge storage capability of the pixel. The storage line 28 is and the storage electrodes 27 are referred to collectively as storage wirings. The shape and disposition of the storage wirings may vary.

The gate wirings (22, 26a, 26b) and the storage wirings (27, 28) may be formed of at least one of an aluminum (Al)-based metal, such as aluminum and an aluminum alloy, silver (Ag)-based metal, such as silver and a silver alloy, copper (Cu)-based metal such as copper and a copper alloy, molybdenum (Mo)-based metal, such as molybdenum and a molybdenum alloy, chrome (Cr), titanium (Ti), and tantalum (Ta). In addition, the gate wirings (22, 26a, 26b) and the storage wirings (27, 28) may have a multilayer structure composed of two conductive layers (not shown) with different physical characteristics. For example, one of the two conductive layers may be formed of metal with low resistivity, such as one of aluminum-based metal, silver-based metal and copper-based metal, in order to reduce a signal delay or a voltage drop of the gate wirings (22, 26a, 26b) and the storage wirings (27, 28). The other one of the conductive layers may include of a different material, in particular, a material having superior contact characteristics with indium tin oxide (ITO) and indium zinc oxide (IZO), such as at least one of a molybdenum-based metal, chrome, titanium, and tantalum. Examples of multilayer structures include a chrome lower layer and an aluminum upper layer and an aluminum lower layer and a molybdenum upper layer. However, the present invention is not limited thereto. The gate wirings (22, 26a, 26b) and the storage wirings (27, 28) may include various metals and conductors. In addition, the gate wirings (22, 26a, 26b) and the storage wirings (27, 28) may include the same material. In addition, the gate wirings (22, 26a, 26b) and the storage wirings (27, 28) may be formed simultaneously.

A gate insulating layer 30, which may be formed of silicon nitride (SiNx), may be disposed on the gate wirings (22, 26a, 26b) and the storage wirings (27, 28).

A pair of semiconductor layers 40a and 40b, which may include hydrogenated amorphous silicon, polycrystalline silicon, or an oxide semiconductor, may be disposed on the gate insulating layer 30. The semiconductor layers 40a and 40b may have various shapes. For example, the semiconductor layers 40a and 40b may be islands or may be formed linearly. In the current embodiment, the semiconductor layers 40a and 40b are islands.

Ohmic contact layers 55a and 56a formed of a material, such as silicide or n+ hydrogenated amorphous silicon doped with n-type impurities in high concentration, may be disposed on the semiconductor layers 40a and 40b, respectively. That is, a pair of the ohmic contact layers 55a and 56a may be formed on the semiconductor layers 40a and 40b, respectively.

A pair of the first and second data lines 62a and 62b and a pair of first and second drain electrodes 66a and 66b, corresponding to the first and second data lines 62a and 62b, respectively, are formed on the ohmic contact layers 55a and 56a and the gate insulating layer 30.

The first and second data lines 62a and 62b generally extend in the vertical direction, crossing the gate line 22 and the storage line 28, and transmit the data voltages to the gate line 22 and the storage line 28. First and second source electrodes 65a and 65b branch from the first and second data lines 62a and 62b and extend toward the first and second drain electrodes 66a and 66b, respectively. As shown in FIG. 3, a pixel is partitioned into a pair of subpixels, and the first data line 62a transmits a data signal to one of the subpixels, and the second data line 62b transmits another data signal to the other one of the subpixels. Specifically, the first data line 62a applies a first data voltage to the first subpixel electrode 82a, and the second data line 62b applies a second data voltage lower than the first data voltage to the second is subpixel electrode 82b.

The first and second data lines 62a and 62b, the first and second source electrodes 65a and 65b, and the first and second drain electrodes 66a and 66b are referred to collectively as data wirings.

The data wirings (62a, 62b, 65a, 65b, 66a, 66b) may include at least on of chrome, molybdenum-based metal, and refractory metal such as tantalum and titanium. In addition, the data wirings (62a, 62b, 65a, 65b, 66a, 66b) may have a multilayer structure composed of a lower layer, which is formed of refractory metal, and an upper layer, which may be formed of a material with low resistivity and is disposed on the lower layer. Examples of multilayer structures include a chrome lower layer and an aluminum upper layer and an aluminum lower layer and a molybdenum upper layer. Alternatively, the multilayer structure may be a three-layer structure having molybdenum-aluminum-molybdenum layers.

The first and second source electrodes 65a and 65b at least partially overlap the semiconductor layers 40a and 40b, respectively. In addition, the first and second drain electrodes 66a and 66b respectively face the first and second source electrodes 65a and 65b with respect to the gate electrodes 26a and 26b, and at least partially overlap the semiconductor layers 40a and 40b, respectively. The ohmic contact layers 55a and 56a described above may be arranged between the semiconductor layers 40a and 40b, which are disposed under the ohmic contact layers 55a and 56a, and the first and second source electrodes 65a and 65b and the first and second data lines 62a and 62b, which are disposed on top of the ohmic contact layers 55a and 56a. The ohmic contact layers 55a and 56a may reduce contact resistance.

A passivation layer 70 may be formed on the data wirings (62a, 62b, 65a, 65b, 66a, 66b) and exposed portions of the semiconductor layers 40a and 40b. The passivation layer is 70 may be formed of at least one of and inorganic material such as silicon nitride or silicon oxide, an organic material having photosensitivity and superior planarization characteristics, and a low-k insulating material disposed using plasma enhanced chemical vapor deposition (PECVD), such as a-Si:C:O or a-Si:O:F. The passivation layer 70 may be composed of a lower inorganic layer and an upper organic layer in order to protect the exposed portions of the semiconductor layers 40a and 40b while taking advantage of the superior characteristics of an organic layer. Further, a red, green or blue color filter layer can be used as the passivation layer 70.

The first and second subpixel electrodes 82a and 82b may be disposed on the passivation layer 70. The first and second subpixel electrodes 82a and 82b are electrically connected to the first and second drain electrodes 66a and 66b by first and second contact holes 76a and 76b, respectively, and are located in pixel regions. The first and second subpixel electrodes 82a and 82b may be formed of transparent conductors, such as ITO or IZO, or reflective conductors such as aluminum.

The first and second subpixel electrodes 82a and 82b are physically and electrically connected to the first and second drain electrodes 66a and 66b by the first and second contact holes 76a and 76b, respectively. Therefore, the first and second subpixel electrodes 82a and 82b may be supplied with different data voltages from the first and second drain electrodes 66a and 66b. Specifically, the first subpixel electrode 82a receives the first data voltage from the first drain electrode 66a, and the second subpixel electrode 82b receives the second data voltage lower than the first data voltage from the second drain electrode 66b.

The first and second subpixel electrodes 82a and 82b, to which the different data voltages are applied, generate an electric field together with the common electrode in the upper is display panel, thereby determining the arrangement of liquid crystal molecules between the first and second subpixel electrodes 82a and 82b and the common electrode.

As described above, referring to FIGS. 2 and 3, each of the first and second subpixel electrodes 82a and 82b and the common electrode form a liquid crystal capacitor Clca or Clcb and thus, sustain a voltage applied thereto even after a TFT, such as a switching devices Qa or Qb, is turned off. Storage capacitors Csta and Cstb may be connected, in parallel, to the liquid crystal capacitors Clca and Clcb to strengthen a voltage sustaining capability. Each of the storage capacitors Csta and Cstb is formed of an overlap of the storage wiring (27, 28) with either the first or second subpixel electrode 82a or 82b, or the first or second drain electrode 66a or 66b connected to the first or second subpixel electrode 82a or 82b.

Referring back to FIGS. 3 through 6, one pixel electrode 82 may include a plurality of unit pixel electrodes 80. The unit pixel electrodes 80 may be arranged in a matrix within a pixel region. In the exemplary embodiment of FIG. 3, the unit pixel electrodes 80 may be arranged in a 7×3 matrix. However, this is merely an example and the device is not limited thereto.

More specifically, referring to FIG. 4, one unit pixel electrode 80 may include a plate PL, a stem ST, and a plurality of branches BR.

The plate PL may be shaped like a quadrangular plate. That is, the plate PL may not be patterned. In an exemplary embodiment, the plate PL may be diamond-shaped. A side of the plate PL may be at an angle of approximately 45 or −45 degrees with respect to the gate line 22. In addition, two diagonal (horizontal and vertical) lines connecting corners of the plate PL may be substantially parallel to the gate line 22 and the first and second data line 62a and 62b, respectively.

The stem ST may protrude from the plate PL. In an exemplary embodiment, the stem ST may protrude from the corners of the plate PL. Here, a direction in which the stem ST protrudes may be substantially parallel to the gate line 22 or the first and second data lines 62a and 62b. In addition, the stem ST may spread out radially from a center of the plate PL. In the exemplary embodiment of FIG. 4, the stem ST protrudes in upward, downward, right and left directions from four corners of the plate PL. However, the present invention is not limited thereto.

The branches BR may protrude from the plate PL or the stem ST. In an exemplary embodiment, the branches BR may be arranged at regular intervals and surround the plate PL and the stem ST. The branches BR may be at an angle of approximately 45 or −45 degrees with respect to the gate line 22. A plurality of first slits 51 may be formed between the branches BR. The branches BR may affect the response speed of liquid crystal molecules.

A length of a side of the plate PL may be greater than a protruding length of the branches BR. In an exemplary embodiment, the length of the side of the plate PL may be in a range of two to four times the protruding length of the branches BR. For example, the length of the side of the plate PL may be 40 μm, and the protruding length of the branches BR may be 20 μm or less. The plate PL may affect the directionality of the liquid crystal molecules. Thus, the directionality and response speed of the liquid crystal molecules may be controlled by appropriately adjusting a ratio of the length of the side of the plate PL and the protruding length of the branches BR.

The unit pixel electrodes 80 may be connected to each other by a connecting electrode 81. The connecting electrode 81 may be interposed between the stems ST of two adjacent unit pixel electrodes 80. That is, the connecting electrode 81 may connect the stems ST is of two adjacent unit pixel electrodes 80. However, the connecting electrode 81 may not be formed between the first subpixel electrode 82a and the second subpixel electrode 82b. That is, a gap 83 may be formed between the first subpixel electrode 82a and the second subpixel electrode 82b.

One pixel electrode 82 includes the first and second subpixel electrodes 82a and 82b which are engaged with each other with the gap 83 therebetween and are electrically insulated from each other.

Each of the first and second subpixel electrodes 82a and 82b includes a plurality of unit pixel electrodes 80 connected by the connecting electrode 81. In an exemplary embodiment, the number of unit pixel electrodes 80 that form the second subpixel electrode 82b may be in a range of 1.5 to 3 times the number of unit pixel electrodes 80 that form the first subpixel electrode 82a. In another exemplary embodiment, the area of a region occupied by the second subpixel electrode 82b in the pixel electrode 82 may be in a range of 1.5 to 3 times the area of a region occupied by the first subpixel electrode 82a in the pixel electrode 82.

The second subpixel electrode 82b surrounds the first subpixel electrode 82a. In the exemplary embodiment of FIG. 3, the second subpixel electrode 82b may include first and last columns of a matrix of unit pixel electrodes 80. In addition, the second subpixel electrode 82b may further include a first row of the matrix of the unit pixel electrodes 80. While the second subpixel electrode 82b can completely surround the first subpixel electrode 82a, the present invention is not limited thereto, and at least a side of the first subpixel electrode 82a may be open. Here, the open side of the first subpixel electrode 82a may face the gate line 22.

In an exemplary embodiment, the second subpixel electrode 82b may not overlap the first and second data lines 62a and 62b. That is, when viewed from above, the second is subpixel electrode 82b may be separated from the first and second data lines 62a and 62b. In addition, the second subpixel electrode 82b may be disposed adjacent to both sides of each of the first and second data lines 62a and 62b. In other words, the second subpixel electrode 82b may be interposed between the first subpixel electrode 82a and each of the first and second data lines 62a and 62b.

An alignment layer (not shown) which aligns the liquid crystal layer may be coated on the first and second subpixel electrodes 82a and 82b and the passivation layer 70.

Figure 7:
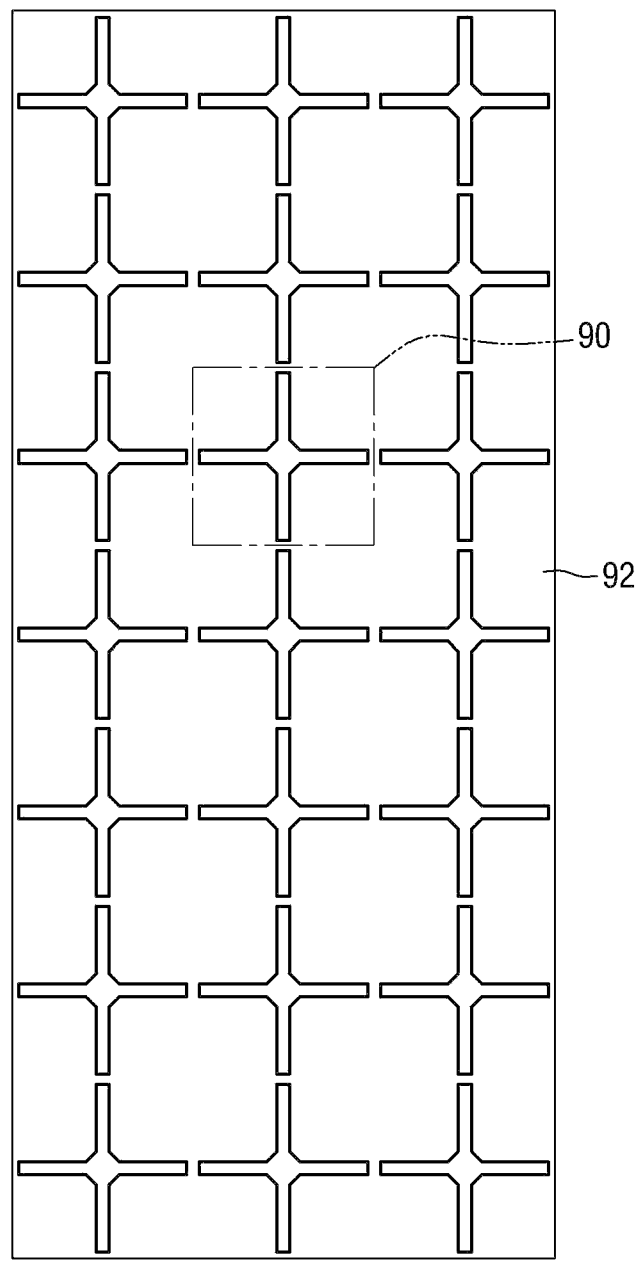
FIG. 7 is a layout diagram of an upper display panel that is coupled to the lower display panel shown in FIG. 3.
Figure 8:
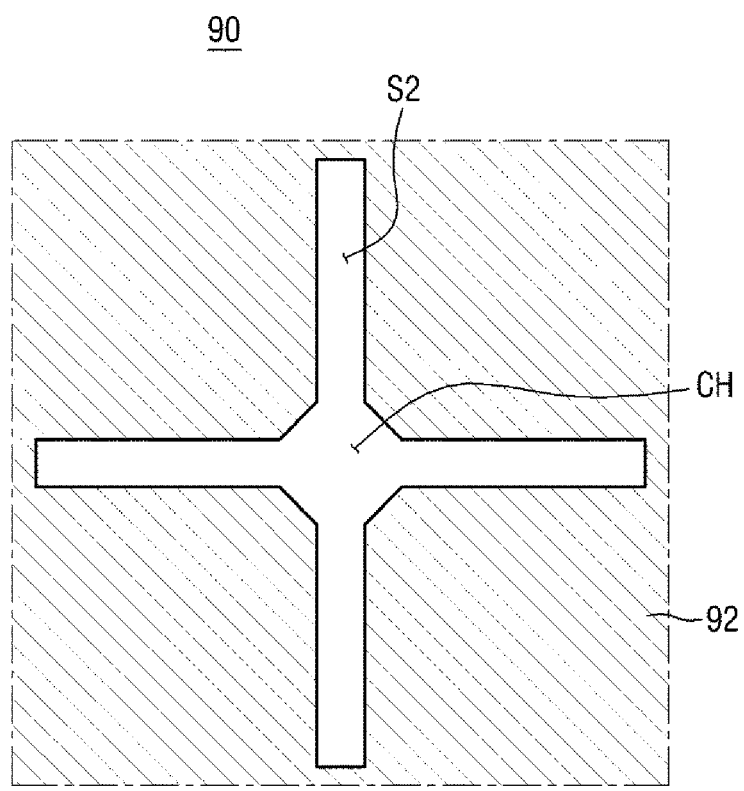
FIG. 8 is an enlarged view of a unit common electrode of the upper display panel shown in FIG. 7.
Figure 9:
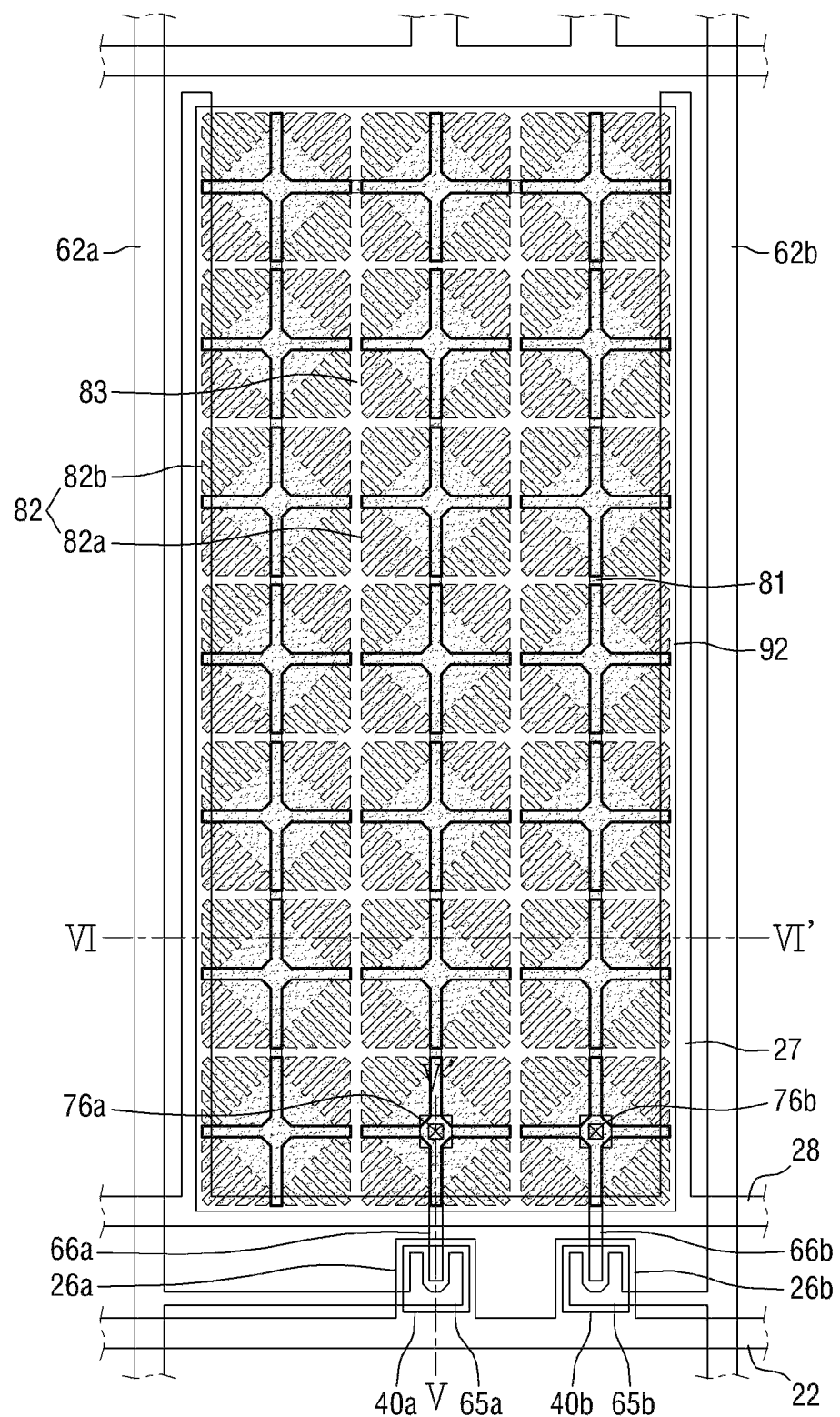
FIG. 9 is a layout diagram of the display device including the lower display panel of FIG. 3 and the upper display panel of FIG. 7.

The upper display panel and the display device will now be described with reference to FIGS. 7 through 9. FIG. 7 is a layout diagram of the upper display panel coupled to the lower display panel shown in FIG. 3. FIG. 8 is an enlarged view of a unit common electrode 90 of the upper display panel shown in FIG. 7. FIG. 9 is a layout diagram of the display device including the lower display panel of FIG. 3 and the upper display panel of FIG. 7.

A black matrix (not shown) for preventing leakage of light and defining pixel regions may be formed on a substrate (not shown) which may be formed of a transparent material, for example, transparent glass or transparent plastic. The black matrix may be formed in a region corresponding to the gate line 22 and the first and second data lines 62a and 62b and a region corresponding to a TFT. In addition, the black matrix may have various shapes in order to prevent the leakage of light in regions around the first and second subpixel electrodes 82a and 82b and the TFT. The black matrix may include a metal (metal oxide), such as chrome or chrome oxide, or organic black resist.

Red, green and blue color filters (not shown) may be arranged sequentially in pixel regions between the black matrix.

An overcoat layer (not shown) may be disposed on the color filters to planarize a step difference between them.

A common electrode 92 is disposed on the overcoat layer and may include a transparent conductive material such as ITO or IZO. The common electrode 92 may be a patterned metal plate.

The common electrode 92 may include a plurality of unit common electrodes 90. The unit common electrodes 90 may each overlap each of the unit pixel electrodes 80, respectively. That is, the unit common electrodes 90 may be the same size as the unit pixel electrodes 80, respectively.

More specifically, referring to FIG. 8, one unit common electrode 90 may include a central hole CH and a second slit S2.

The central hole CH may overlap the center of the plate PL. In an exemplary embodiment, a center of the central hole CH may be located on the center of the plate PL. In addition, the shape of the central hole CH may correspond to the shape of the plate PL. In an exemplary embodiment, the central hole CH may be shaped like a quadrangle, more specifically, a diamond.

The second slit S2 may protrude from the central hole CH. The second slit S2 may overlap the plate PL and the stem ST. In an exemplary embodiment, the second slit S2 may be parallel to the gate line 22 or the first and second data lines 62a and 62b. In other words, the second slit S2 may be cross-shaped. A lengthwise direction of the second slit S2 may be different from a lengthwise direction of the first slits S1.

An alignment layer (not shown) that aligns liquid crystal molecules may be coated on the common electrode 92.

The lower and upper display panels structured as described above may be aligned is and coupled to each other, and a liquid crystal material may be injected between the panels to complete the basic structure of the display device according to an embodiment of the present invention.

In a state where no electric field is applied between the pixel electrode 82 and the common electrode 92, the liquid crystal molecules included in the liquid crystal layer are aligned such that their direction is perpendicular to the lower display panel and the upper display panel. In addition, the liquid crystal molecules may display negative dielectric constant anisotropy.

The display device may also include other elements such as polarizers, a backlight, or other elements. The polarizers may be respectively placed on both sides of the disclosed pixel structure. In an exemplary embodiment, one of their transmission axes is parallel to the gate line 22, and the other one is perpendicular to the gate line 22.

In the display device according to the current embodiment, the first and second data lines 62a and 62b are not coupled to the first subpixel electrode 82a to which a relatively high voltage is applied but are instead coupled to the second subpixel electrode 82b to which a relatively low voltage is applied. Thus, vertical crosstalk can be minimized. In addition, the storage electrode 27 is interposed between each of the first and second data lines 62a and 62b and the second subpixel electrode 82b, and a portion of the storage electrode 27 overlaps the second subpixel electrode 82b. Therefore, the storage electrode 27 and the second subpixel iii electrode 82b can form a storage capacitor, and, accordingly, the coupling of the second subpixel electrode 82b to the first and second data lines 62a and 62b can further be reduced.

Figure 10:
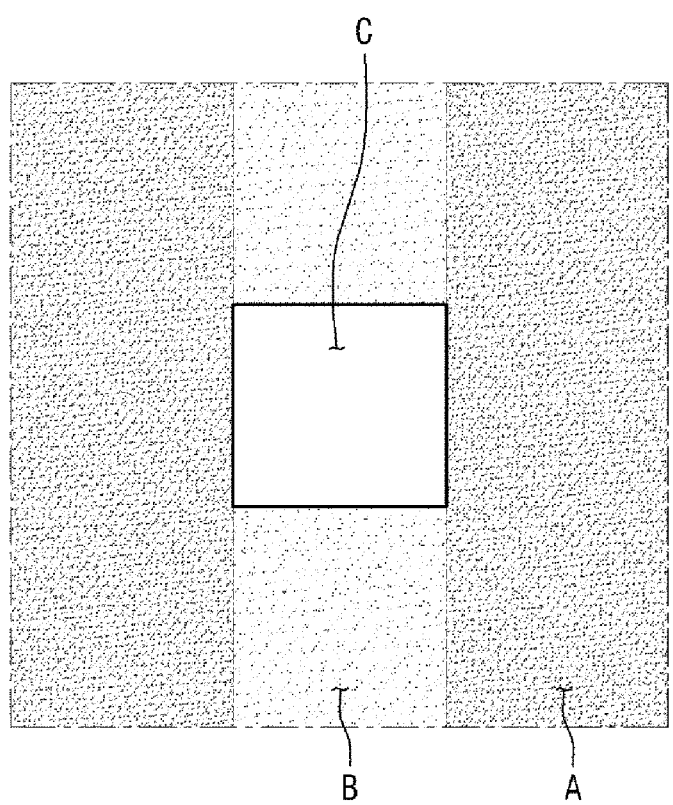
FIG. 10 is a plan view of the screen of the display device shown in FIG. 1.
Figure 11:
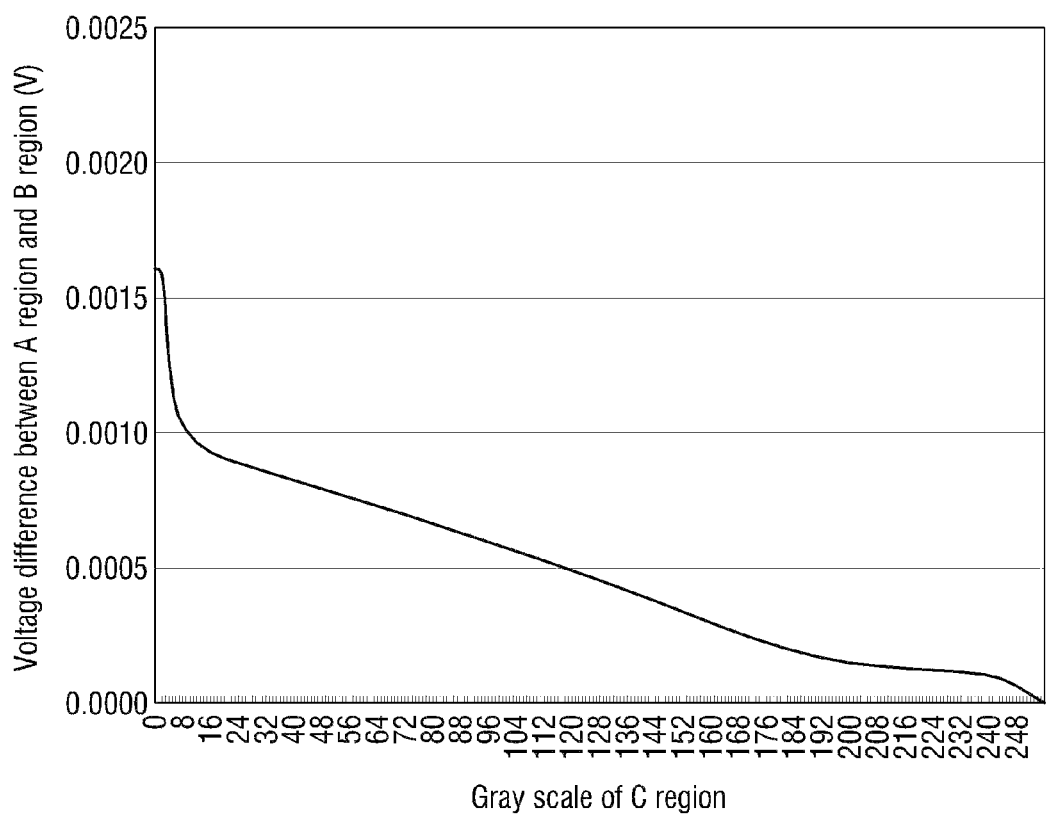
FIG. 11 is a graph illustrating the voltage difference between an A region and a B region with respect to the grayscale of a C region shown in FIG. 10.
Figure 12:
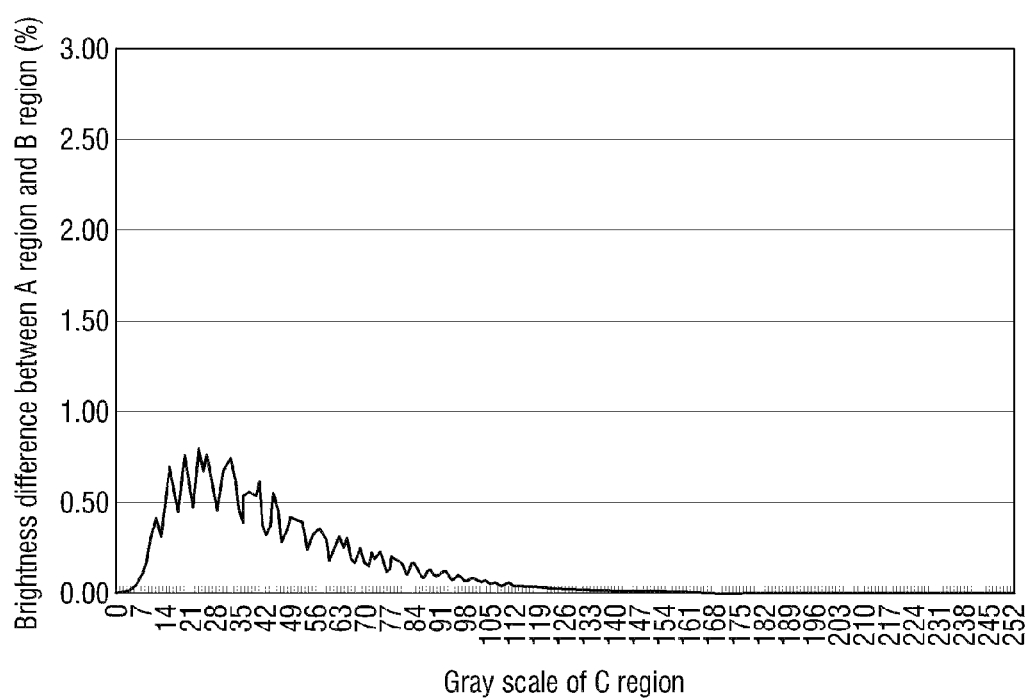
FIG. 12 is a graph illustrating the brightness difference between the A region and the B region with respect to the grayscale of the C region.

Minimizing vertical crosstalk will now be described in detail with reference to FIGS. 10 through 12. FIG. 10 is a plan view of the screen of the display device shown in FIG. 1. FIG. 11 is a graph illustrating the voltage difference between an A region and a B region with is respect to the grayscale of a C region shown in FIG. 10. FIG. 12 is a graph illustrating the brightness difference between the A region and the B region with respect to the grayscale of the C region.

Referring to FIG. 10, after the entire screen of the display device is set to a gray color, if a white box is displayed in a center of the screen, the screen of the display device may be divided into three regions. If a region where the white box is located is referred to as the C region, a region on the right and left sides of the C region may be referred to as the A region, and a region above and below the C region may be referred to as the B region. Here, a small voltage difference and a small brightness difference between the A region and the B region indicates little vertical crosstalk in the display device.

Referring to FIGS. 11 and 12, there is a small voltage difference and a small brightness difference between the A region and the B region with respect to the grayscale of the C region. In particular, the brightness difference between the A region and the B region is only 0.7% when a gray value of the C region is 28. This brightness difference is difficult for the human eye to discern. That is, it is difficult for a human eye to recognize a boundary between the A region and the B region. Accordingly, the display quality of the display device can be improved.

In the display device according to the current embodiment, it is possible to reduce a process margin between the first and second data lines 62a and 62b and the pixel electrode 82 to prevent vertical crosstalk, thereby improving the aperture ratio of the display device. Specifically, a reduction in a distance d1 (see FIG. 6) between each of the first and second data lines 62a and 62b and the pixel electrode 82 and a reduction in a distance d2 (see FIG. 6) between each of the first and second data lines 62a and 62b and the storage electrode 27 does not is markedly increase vertical crosstalk. Thus, the aperture ratio of the display device can be improved.

A display device according to another embodiment of the present invention will now be described with reference to FIGS. 13 through 15. For simplicity, elements having the same functions as those of the previous embodiment of FIGS. 3 through 9 are indicated by like reference numerals, and a redundant description thereof will be omitted. The current embodiment will hereinafter be described, focusing mainly on differences with the previous embodiment.

A lower display panel of the display device according to the current embodiment will be described with reference to FIG. 13. FIG. 13 is a layout diagram of the lower display panel including a pixel of the display device according to another embodiment of the present invention.

Figure 13:
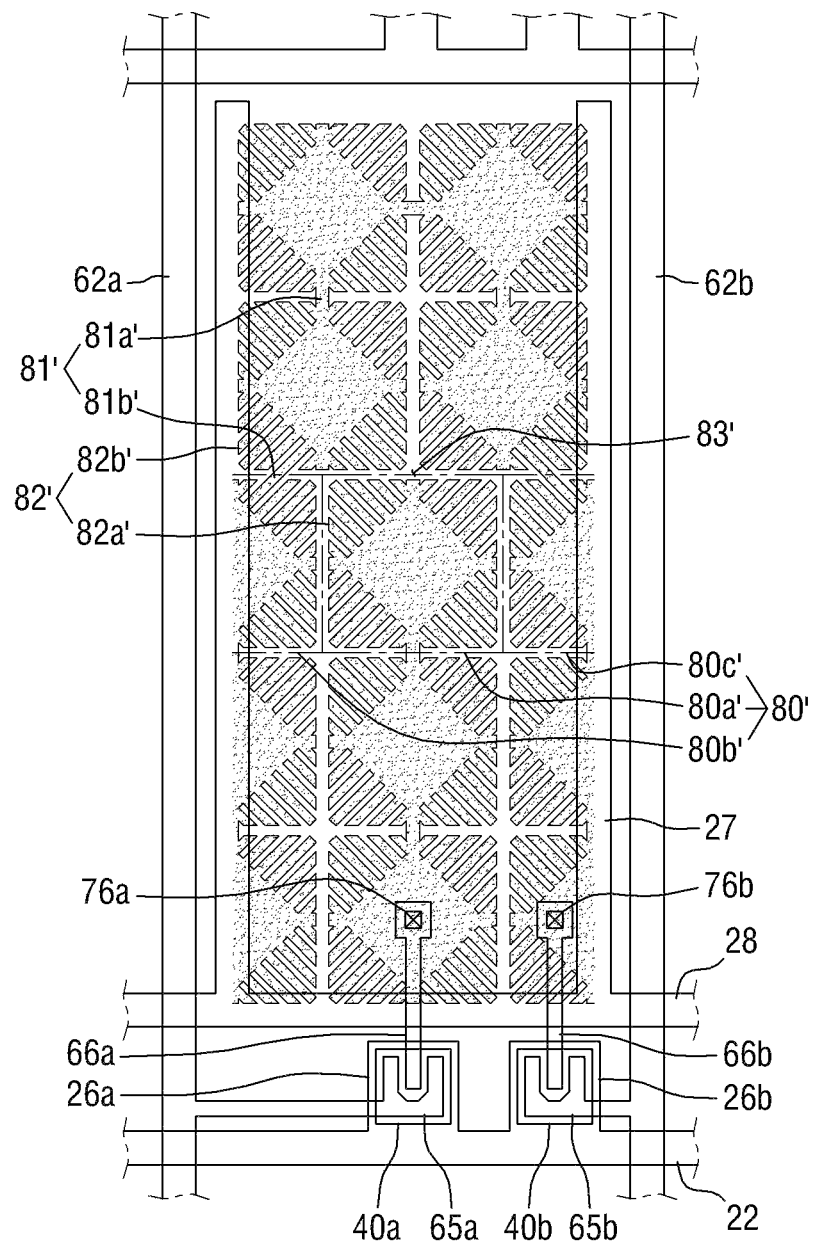
FIG. 13 is a layout diagram of a lower display panel including a pixel of a display device according to a second exemplary embodiment of the present invention.

Referring to FIG. 13, a pixel electrode 82' may include a plurality of unit pixel electrodes 80'. The unit pixel electrodes 80' may include first through third unit pixel electrodes 80a' through 80c'.

The first unit pixel electrode 80a' may have substantially the same shape as each of the above-described unit pixel electrodes 80. However, a total size of the first unit pixel electrode 80a' may be different from a total size of each of the unit pixel electrodes 80 depending on a size of a pixel region surrounded by a gate line 22 and data lines 62a and 62b.

The second unit pixel electrode 80b' may have the same shape as a right half of the first unit pixel electrode 80a'. In addition, the third unit pixel electrode 80c' may have the same shape as a left half of the first unit pixel electrode 80a'. That is, if connected, the second unit pixel electrode 80b' and the third unit pixel electrode 80c' may form the first unit pixel is electrode 80a'.

The pixel electrode 82' may include a first subpixel electrode 82a' and a second subpixel electrode 82b' separated from each other by a gap 83'. The first subpixel electrode 82a' may include only a plurality of first unit pixel electrodes 80a' connected by a connecting electrode 81'. The second subpixel electrode 82b' may include a plurality of first through third unit pixel electrodes 80a' through 80c' connected by the connecting electrode 81'.

Specifically, the first unit pixel electrode 80a' of the second subpixel electrode 82b' may be disposed above or below the first subpixel electrode 82a'. The first unit pixel electrode 80a' located above or below the first subpixel electrode 82a' may be provided in a plurality, and the first unit pixel electrodes 80a' may be arranged in a matrix. In the exemplary embodiment of FIG. 13, the first unit pixel electrodes 80a' located above the first subpixel electrode 82a' are arranged in a 2×2 matrix, but the present invention is not limited thereto. In addition, the first unit pixel electrodes 80a' located above or below the first subpixel electrode 82a' may be connected to each other by a first connecting electrode 81a. Here, the first connecting electrode 81a' may connect stems ST of adjacent first unit pixel electrodes 80a'.

The second and third unit pixel electrodes 80b' and 80c' of the second subpixel electrode 82b' may be located on the left and right sides of the first subpixel electrode 82a', respectively. That is, the second and third unit pixel electrodes 80b' and 80c' may be disposed between the first subpixel electrode 82a' and the data lines 62a and 62b. In addition, the second and third unit pixel electrodes 80b' and 80c' may be placed symmetrical to each other with respect to a central axis of the first subpixel electrode 82a'. The second and third unit pixel electrodes 80b' and 80c' may be connected to each other by the first connecting electrode 81a'.

The first unit pixel electrode 80a' and the second unit pixel electrode 80b' of the is second subpixel electrode 82b' may be connected to each other by a second connecting electrode 81b'. Here, the second connecting electrode 81b' may connect branches BR of the first unit pixel electrode 80a' to branches BR of the second unit pixel electrode 80b'. Likewise, the first unit pixel electrode 80a' and the third unit pixel electrode 80c' of the second subpixel electrode 82b' may also be connected to each other by the second connecting electrode 81b'.

An upper display panel and the display device will now be described with reference to FIGS. 14 and 15. FIG. 14 is a layout diagram of an upper display panel that is coupled to the lower display panel of FIG. 13. FIG. 15 is a layout diagram of the display device including the lower display panel of FIG. 13 and the upper display panel of FIG. 14.

Figure 14:
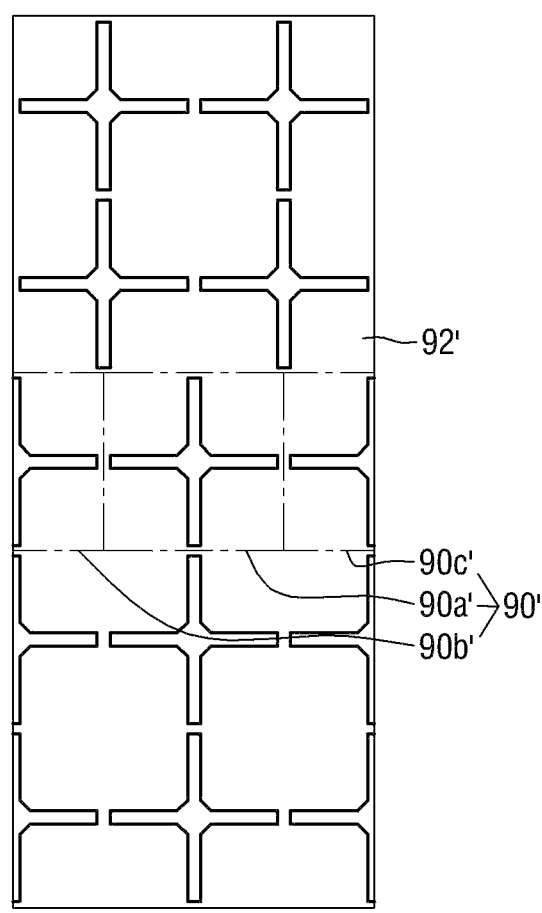
FIG. 14 is a layout diagram of an upper display panel that is coupled to the lower display panel of FIG. 13.

Referring to FIGS. 14 and 15, a common electrode 92' of the upper display panel of the display device according to the current embodiment may include a plurality of unit common electrodes 90'. The unit common electrodes 90' may include first through third unit common electrodes 90a' through 90c'.

The first unit common electrode 90a' may have substantially the same shape as each of the above-described unit common electrodes 90. However, a total size of the first unit common electrode 90a' may be different from a total size of each of the unit common electrodes 90 depending on a size of a pixel region surrounded by the gate line 22 and the data lines 62a and 62b.

The second unit common electrode 90b' may have the same shape as a right half of the first unit common electrode 90a'. In addition, the third unit common electrode 90c' may have the same shape as a left half of the first unit common electrode 90a'. That is, if connected, the second unit common electrode 90b' and the third unit common electrode 90c' may form the first unit common electrode 90a'.

The first through third unit common electrodes 90a' through 90c' may overlap the first through third unit pixel electrodes 80a' through 80c', respectively. That is, the arrangement of the first through third unit common electrodes 90a' through 90c' may correspond to the arrangement of the first through third unit pixel electrodes 80a' through 80c'.

In the display device according to the current embodiment, vertical crosstalk can be minimized by adjusting the arrangement of the unit pixel electrodes 80' and the arrangement of the unit common electrodes 90' according to the size of a pixel region. In addition, an aperture ratio of the display device can be improved by reducing a distance between the data lines 62a and 62b and the pixel electrode 82'.

Embodiments of the present invention provide at least one of the following advantages.

That is, it is possible to minimize vertical crosstalk in a display device.

In addition, an aperture ratio of the display device can be improved.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A display device, comprising:
   a first substrate;
   a gate wiring disposed on the first substrate and extending in a first direction;
   a data wiring insulated from the gate wiring, crossing the gate wiring, and extending in a second direction; and
   a pixel electrode comprising a first subpixel electrode configured to receive a first data voltage from the data wiring and a second subpixel electrode configured to receive a second data voltage lower than the first data voltage from the data wiring,
   wherein the first subpixel electrode is partially surrounded by the second subpixel electrode, wherein the first subpixel electrode has a substantially rectangular shape, wherein the second subpixel electrode has a substantially "U" shape and does not overlap the data wiring, wherein at least one side of the first subpixel electrode is not surrounded by the second subpixel electrode, and wherein each of the first subpixel electrode and the second subpixel electrode comprises a plurality of unit pixel electrodes, each of the plurality of unit pixel electrodes comprising:
  a plate;
  a stem protruding from the plate; and
  a plurality of branches protruding from at least one of the plate and the stem.

2. The display device of claim 1, wherein the second subpixel electrode is disposed adjacent to both sides of the data wiring.

3. The display device of claim 1, wherein one side of the first subpixel electrode not surrounded by the second subpixel electrode faces the gate wiring.

4. The display device of claim 1, further comprising:
a storage wiring interposed between the second subpixel electrode and the data wiring,
wherein at least a portion of the storage wiring overlaps the second subpixel electrode.

5. The display device of claim 1, wherein the plate has a quadrangular shape, the stem protrudes from corners of the plate, and the branches are arranged at regular intervals.

6. The display device of claim 5, wherein a length of a side of the plate is greater than a protruding length of the branches.

7. The display device of claim 1, wherein the unit pixel electrodes are arranged in a matrix of a plurality of rows parallel to the gate wiring and a plurality of columns parallel to the data wiring, and the second subpixel electrode comprises first and last columns of the unit pixel electrodes.

8. The display device of claim 7, wherein the second subpixel electrode further comprises a first row of the unit pixel electrodes.

9. The display device of claim 1, wherein each of the first subpixel electrode and the second subpixel electrode comprises the unit pixel electrodes electrically connected by a connecting electrode, wherein the connecting electrode is interposed between at least one of adjacent stems and branches.

10. The display device of claim 1, wherein the unit pixel electrodes comprise:
  a first unit pixel electrode;
  a second unit pixel electrode having the same shape as a right half of the first unit pixel electrode; and
  a third unit pixel electrode having the same shape as a left half of the first unit pixel electrode.

11. The display device of claim 10, wherein the first subpixel electrode comprises the first unit pixel electrode only, and the second subpixel electrode comprises the first through third unit pixel electrodes.

12. The display device of claim 11, wherein the first unit pixel electrode of the second subpixel electrode is disposed above or below the first subpixel electrode, and the second and third unit pixel electrodes of the second subpixel electrode are respectively disposed on left and right sides of the first subpixel electrode and are symmetrical to each other with respect to a central axis of the first subpixel electrode.

13. The display device of claim 1, further comprising:
a second substrate facing the first substrate;
a common electrode disposed on the second substrate; and
a liquid crystal layer disposed between the first and second substrates,
wherein the common electrode comprises a plurality of unit common electrodes, and each of the plurality of unit common electrodes comprises:
a central hole overlapping each of the unit pixel electrodes and overlaps a center of the plate; and
a slit overlapping the plate and the stem and protruding from the central hole.

14. A display device, comprising:
a substrate;
a gate wiring disposed on the substrate and extending in a first direction;
a data wiring insulated from the gate wiring, crossing the gate wiring, and extending in a second direction; and
a pixel electrode comprising a first subpixel electrode configured to receive a first data voltage from the data wiring and a second subpixel electrode configured to receive a second data voltage lower than the first data voltage from the data wiring,
wherein the first subpixel electrode is partially surrounded by the second subpixel electrode,
wherein the first subpixel electrode has a substantially rectangular shape,
wherein the second subpixel electrode has a substantially "U" shape and is disposed adjacent to both sides of the data wiring,
wherein at least one side of the first subpixel electrode is not surrounded by the second subpixel electrode, and
wherein each of the first subpixel electrode and the second subpixel electrode comprises a plurality of unit pixel electrodes, each of the plurality of unit pixel electrodes comprising:
  a plate;
  a stem protruding from the plate; and
  a plurality of branches protruding from at least one of the plate and the stem.

15. The display device of claim 14, wherein the second subpixel electrode does not overlap the data wiring.

16. The display device of claim 14, wherein one side of the first subpixel electrode not surrounded by the second subpixel electrode faces the gate wiring.

17. A display device, comprising:
a first substrate;
a gate wiring disposed on the first substrate and extending in a first direction;
a data wiring insulated from the gate wiring, crossing the gate wiring, and extending in a second direction; and
a pixel electrode comprising a first subpixel electrode configured to receive a first data voltage from the data wiring and a second subpixel electrode configured to receive a second data voltage lower than the first data voltage from the data wiring, the second subpixel electrode surrounding the first subpixel electrode,
wherein:
the second subpixel electrode comprises a plurality of unit pixel electrodes;
the plurality of unit pixel electrodes are disposed between the first subpixel electrode and the data wiring; and
each of the plurality of unit pixel electrodes disposed between the first subpixel electrode and the data wiring comprises:
  a plate;
  a stem protruding from the plate; and
  a plurality of branches protruding from at least one of the plate and the stem.

18. The display device of claim 17, wherein the second subpixel electrode does not overlap the data wiring.

19. The display device of claim 17, further comprising:
a second substrate facing the first substrate;
a common electrode disposed on the second substrate; and
a liquid crystal layer disposed between the first and second substrates,
wherein the common electrode comprises a plurality of unit common electrodes, and each of the plurality of unit common electrodes comprises:
a central hole overlapping each of the unit pixel electrodes and a center of the plate; and
a slit overlapping the plate and the stem and protruding from the central hole.

* * * * *